Oct. 5, 1965　　　A. F. BRUSCH ET AL　　　3,210,029
AIRCRAFT LANDING SYSTEM
Filed Oct. 22, 1962　　　　　　　　　　　　3 Sheets-Sheet 1
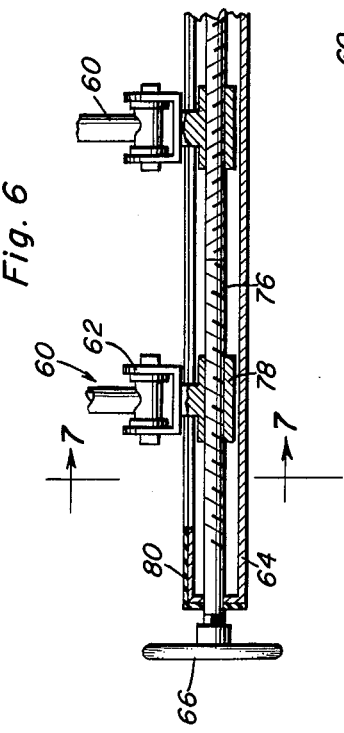
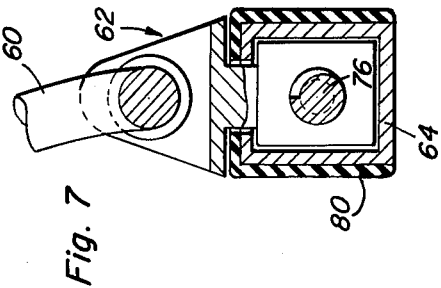
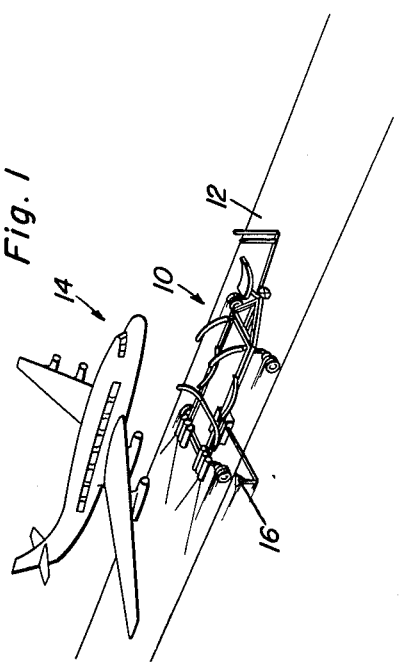
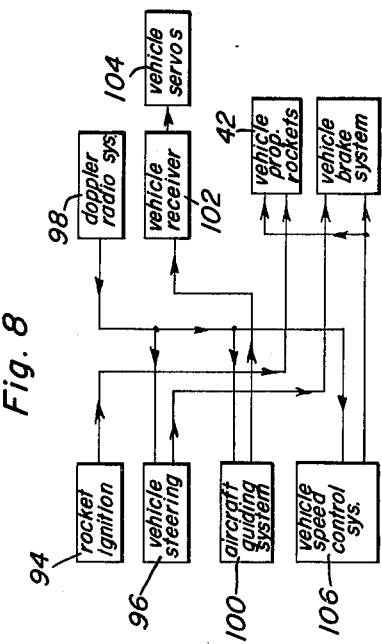
Archie F. Brusch
Joseph H. Uphoff
INVENTORS
BY Clarence A. O'Brien
and Harvey B. Jacobson
Attorneys

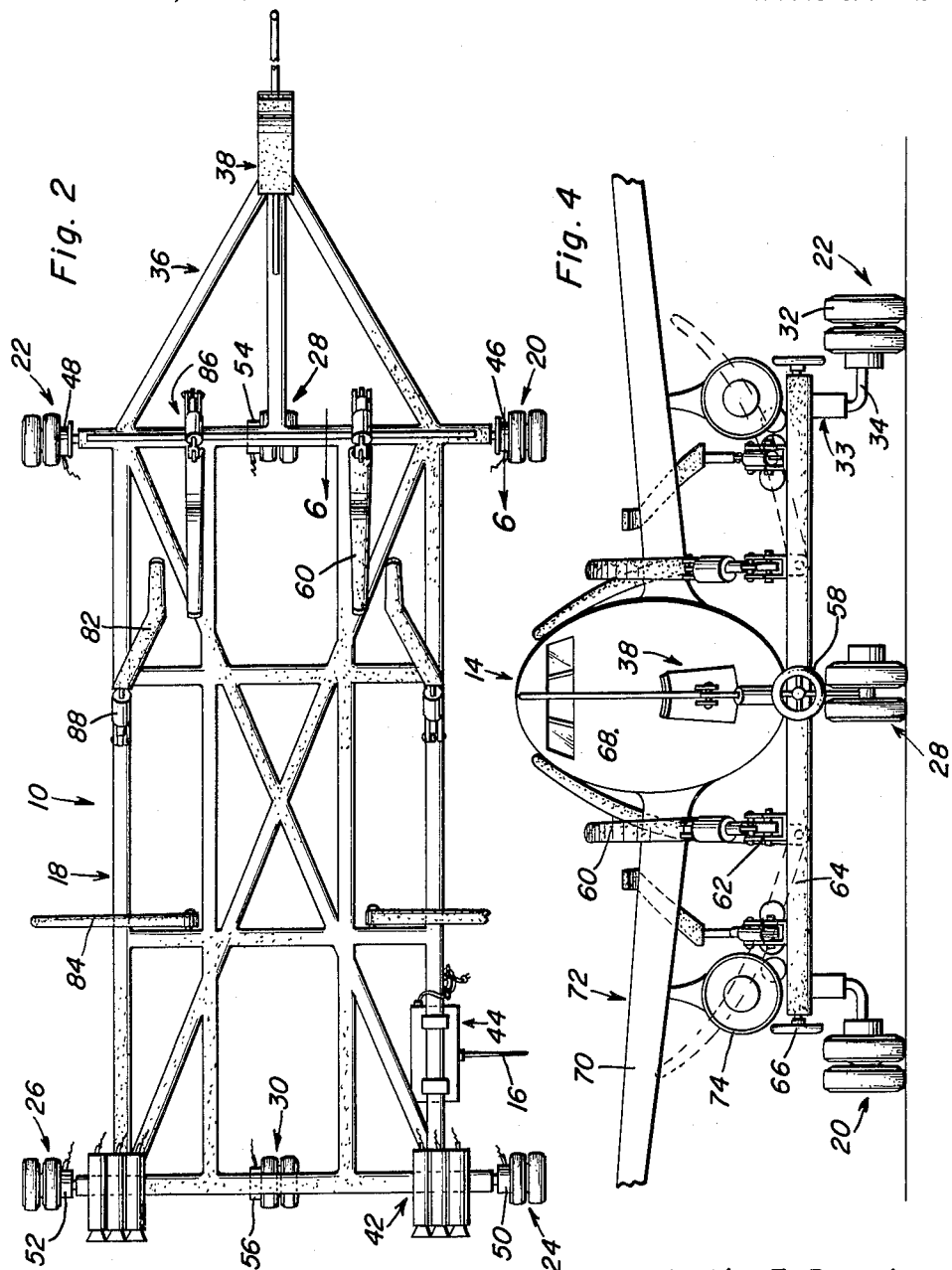

Oct. 5, 1965  A. F. BRUSCH ET AL  3,210,029
AIRCRAFT LANDING SYSTEM
Filed Oct. 22, 1962  3 Sheets-Sheet 3
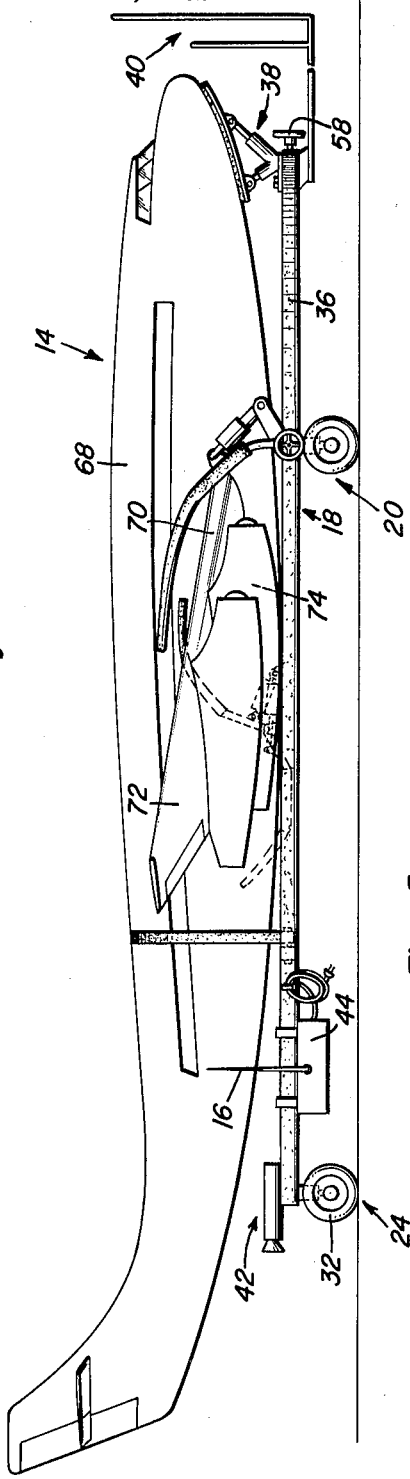
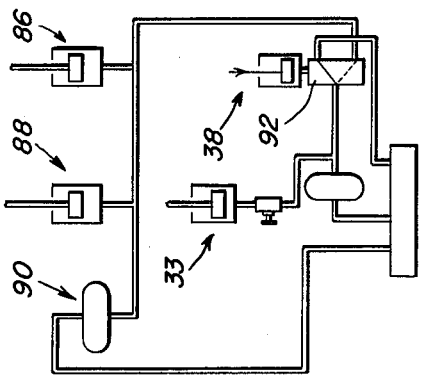
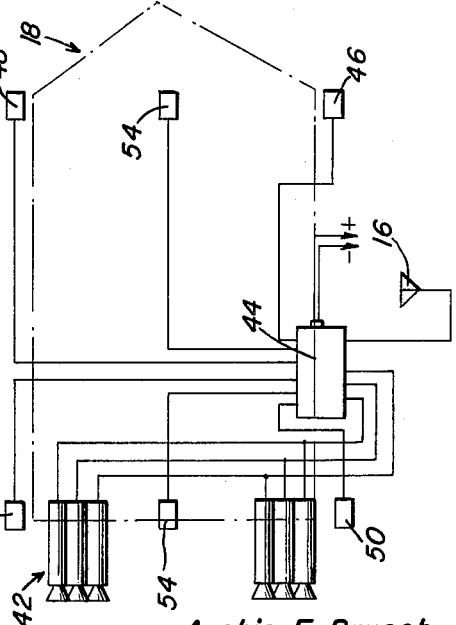
Archie F. Brusch
Joseph H. Uphoff
INVENTORS
BY Clarence A. O'Brien
and Harvey B. Jacobson
Attorneys United States Patent Office 3,210,029
Patented Oct. 5, 1965

3,210,029
AIRCRAFT LANDING SYSTEM
Archie F. Brusch, 841 Stark St., and Joseph H. Uphoff, 1288 E. Lincoln, both of Woodburn, Oreg.
Filed Oct. 22, 1962, Ser. No. 232,206
4 Claims. (Cl. 244—114)

This invention relates to an emergency aircraft landing system and is particularly useful in connection with the safe landing of aerial vehicles having no landing gear facilities, or damaged landing gear facilities.

The system and apparatus of the present invention differs from mobile landing facilities heretofore devised in that no mobile landing platform of any appreciable length is involved as a result of which mobile landing devices heretofore proposed, have been impracticable. Instead, the mobile landing system of the present invention takes advantage of existing ground controlled approach equipment, radar guidance controls for the aircraft in connection with such ground controlled approach equipment and Doppler radar systems now available for vehicle speed control purposes. Accordingly, the mobile landing facilities of the present invention are capable of making contact with an approaching aircraft or other aerial vehicle such as a space-craft, with relative movement between the aerial vehicle and the mobile landing vehicle approaching zero, said contact setting into operation clamping apparatus operative to clamp the aerial vehicle to the mobile landing vehicle. The landing vehicle is therefore provided with facilities for achieving a speed approaching that of the approaching aerial vehicle as the aerial vehicle comes into close proximity to the landing vehicle for contact therewith. It is therefore a primary object of the present invention, to provide a mobile landing system for aerial vehicles which is dimensionally and operationally practicable.

Another object of the present invention is to provide a mobile landing system for aerial vehicles having guidance and speed control facilities operative in conjunction with ground controlled approach equipment heretofore utilized for guided landings of aircraft.

An additional object of the present invention is to provide a mobile landing system and vehicle operative to clamp an approaching aerial vehicle to a shock absorbing frame of the landing vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a simplified perspective view of the mobile landing apparatus prior to reception of an approaching aircraft.

FIGURE 2 is a top plan view of the mobile landing vehicle of the present invention.

FIGURE 3 is a side elevational view of the mobile landing vehicle with an aircraft supported thereon.

FIGURE 4 is a front elevational view of the vehicle and aircraft illustrated in FIGURE 3.

FIGURE 5 is a diagrammatic illustration of the vehicle propulsion, guidance and braking system.

FIGURE 6 is a partial sectional view taken substantially through a plane indicated by section line 6—6 in FIGURE 2.

FIGURE 7 is a sectional view taken substantially through a plane indicated by section line 7—7 in FIGURE 6.

FIGURE 8 is a circuit flow diagram of the landing system associated with the mobile landing vehicle of the present invention.

FIGURE 9 is a simplified exemplary hydraulic control system associated with the mobile landing vehicle.

Referring now to the drawings in detail, it will be observed from FIGURE 1, that the landing vehicle generally referred to by reference numeral 10 is adapted to be propelled and guided along the runway 12 for the purpose of receiving and landing an aerial vehicle such as the aircraft 14. It will therefore be appreciated, that the landing system of the present invention is capable of being used for emergency landing purposes where the aircraft landing gear is damaged or may also be used in connection with the landing of aerial vehicles such as space-craft having no self-contained landing facilities. Control over the movement of the landing vehicle 10, is exercised from a remote location through use of radio control equipment radiating electromagnetic energy adapted to be received by the antenna 16 diagrammatically illustrated in FIGURE 1 for controlling the operation of the landing vehicle.

Referring now to FIGURES 2, 3 and 4, it will be observed that the vehicle 10 includes a suitably braced horizontal frame assembly 18 which is covered with shock absorbing material such as rubber in order to cushion engagement of the frame by the aerial vehicle 14 and prevent damage to the aerial vehicle. Mounted adjacent four corners of the frame assembly 18, are forward dirigible wheel assemblies 20 and 22 and rear dirigible wheel assemblies 24 and 26.

Also mounted adjacent the forward and rear ends of the frame assembly, are wheel assemblies 28 and 30. Each wheel assembly is connected to a frame elevating and lowering device 33 and includes a traction wheel 32 mounted on a steering axle 34 in the case of a dirigible wheel assembly. The dirigible wheel assemblies are therefore operative to both steer and control the speed of the landing vehicle. The wheel assemblies 28 and 30 on the other hand, provide additional support for the vehicle frame assembly and are further operative to control the vehicle speed. Connected to the forward end of the vehicle is a forwardly projecting frame portion 36 supporting at a forward end thereof, a nose sensing device 38 and an adjustably positioned sighting guide 40.

In order to propel the landing vehicle at speeds exceeding the approaching speed of the aircraft 14 or other aerial vehicle to be landed, there are provided two banks of reaction engines 42. These reaction engines may be in the form of rocket motors utilized in connection with jet assisted take-off of aircraft, these rocket motors being mounted on the rear portion of the frame assembly on opposite lateral sides thereof. Each of the rocket motors 42 is therefore provided with an ignition mechanism electrically connected to the power control assembly generally referred to by reference numeral 44 mounted on one side of the vehicle frame and to which the antenna 16 is connected for receiving the remote control signals hereinbefore mentioned. The power control assembly 44 may have associated therewith a source of power in the form of rechargeable batteries and will contain all of the necessary power operated control components. Also electrically connected to the control assembly 44, are power operated brake devices 46, 48, 50 and 52 associated with the forward and rear dirigible wheel assemblies by means of which movement of the dirigible wheel assemblies are simultaneously retarded by the same amount in order to reduce the speed of the vehicle or retarded by differential amounts in order to steer the vehicle in a different direction. The power brake devices 54 and 56 associated with the wheel assemblies 28 and 30, will simultaneously retard movement of the wheel assemblies by the same amount in order to control the vehicle speed. It will be appreciated that vehicle speed control will be necessary in order to reduce the speed of the landing vehicle from that brought about by the rocket motors 42 in order to approach the speed of the approaching aircraft 14. Also, a certain degree of steering guidance will be necessary in order to properly position the landing vehicle with respect to the approaching aircraft. After contact is made with the aircraft and it is clamped to the landing vehicle, the power operated brake devices may then be operated for the purpose of gradually reducing the speed of the vehicle.

Referring now to FIGURE 5, it will be observed that the landing vehicle frame assembly 18 shown in dotted lines, mounts the rocket motors 42 shown operatively connected to the control assembly 44 for the purpose of igniting the rocket motors in order to start the vehicle. The power brake devices are shown operatively connected to the control assembly 44 whereby these devices are either differentially or equally operative to retard an associated wheel assembly in order to guide and control vehicle speed. The brake devices 54 and 56 are also operatively connected to the control assembly for reducing the speed of the vehicle. In this manner, the vehicle is brought into close proximity with the approaching aircraft and at a relative speed approaching zero so that contact may be made between the aircraft and the vehicle with a minimum degree of shock. Inasmuch as a certain amount of fine control will be exercised by the aircraft pilot in making contact with the landing vehicle, the sighting guide 40 is provided in forward projecting relation to the vehicle frame portion 36. The sighting guide is adjustably positioned on the frame assembly by means of the handwheel 58 in order to accommodate aircraft and aerial vehicles of different shapes and sizes. It will therefore be appreciated, that the aircraft pilot will be able to guide the aircraft nose portion into yieldable engagement with the nose sensing device 38 which is therefore located on the vehicle frame portion 36 adjacent to the sighting guide 40.

In response to engagement of the nose sensing device 38 by the aircraft when it is in proper position on the vehicle, a clamp engaging system is rendered operative to clamp the aircraft to the vehicle. The aircraft engaging clamping system therefore includes a pair of forward airfoil clamping arms 60 covered with suitable shock absorbing material, said clamping arms 60 being pivotally mounted in spaced relation to each other by pivot brackets 62 on a transverse frame member 64 of the frame assembly. The forward airfoil clamping arms 60 as more clearly seen in FIGURES 6 and 7, are adjustably positioned by means of the adjustment handwheels 66 so as to accommodate aircraft of different shapes and to avoid contact with the aircraft fuselage 68 and to engage the leading edge 70 of the airfoil member 72 in spaced relation to the aircraft propelling unit 74. Accordingly, any suitable adjustment mechanism may be associated with the adjustment handwheel 66 such as the oppositely threaded screw member 76 which is threadedly engaged with the nut members 78 on which the pivot brackets 62 for the clamping arms 60 are connected. It will also be observed from FIGURES 6 and 7, that the frame member 64 is covered with shock absorbing material 80 as hereinbefore mentioned in connection with the frame assembly 18. Similar shock absorbing material will of course cover the engaging portions of the clamping arms 60.

Pivotally mounted by the frame assembly for engagement with the trailing edge of the airfoil members 72, are a pair of clamping arms 82 which are pivotally movable in planes parallel to the pivotal plane of movement of the arms 60 and in the direction of vehicle movement. Finally, a pair of clamping arms 84 are pivotally mounted by the frame assembly rearwardly of the clamping arms 82 for pivotal movement in a plane perpendicular to the direction of vehicle movement in order to clamp therebetween, the fuselage 68 of the aircraft. In order to impart pivotal movement to the clamping arms aforementioned, each of the clamping arms 60 has a hydropneumatic power operated cylinder device 86 associated therewith while the clamping arms 82 have the hydropneumatic power operated cylinder devices 88 associated therewith. Fluid motors are also operatively connected to the fuselage clamping arms 84 for the purpose of imparting movement thereto from the retracted positions. As hereinbefore indicated, the hydraulic cylinder devices and fluid motors 90 associated with the clamping arms, are energized in response to engagement of the nose sensing device 38 indicating that the aircraft is in the proper position on the landing vehicle. Accordingly, as shown in FIGURE 9, the hydraulic cylinder devices and fluid motors may be connected in a hydraulic circuit controlled by the valve 92 which responds to a force derived from the nose sensing device 38 in order to pressurize the hydraulic cylinders and fluid motors. Clamping of the aircraft to the landing vehicle will therefore be effected when the aircraft is in proper position on the vehicle as sensed by the device 38. The frame is then lowered by the devices 33.

The practicality of the mobile landing vehicle is of course dependent upon the ability of the aircraft to be maneuvered and the landing vehicle guided in relation to each other and at the proper relative speeds so as to enable the aircraft to be positioned on the vehicle at substantially the same speed as the vehicle. Ground controlled approach equipment now available in connection with guided landings of aircraft, may therefore be utilized for such purpose. When the aircraft is approaching a landing runway, and is over a critical area thereof, a radio signal may be dispatched to the vehicle control assembly 44 for the purpose of igniting the rocket motors 42 in order to start the vehicle moving. The landing vehicle will accordingly rapidly acquire a speed in excess of the approaching speed of the aircraft. The aircraft may then be guided relative to the moving vehicle and the vehicle guided relative to the aircraft by use of radar equipment. Also, Doppler radar equipment may be used to control the speed of the vehicle in accordance with that of the aircraft which speed control may be accomplished by reducing the speed of the vehicle in a manner hereinbefore indicated. Referring therefore to FIGURE 8, it will be observed that the ground controlled approach equipment will include means 94 for issuing a rocket ignition signal that is operative through the control assembly 44 to ignite the vehicle propelling rockets 42. A vehicle steering system 96 will therefore also be associated with the ground control approach apparatus receiving signals from the control transmitter 98 so as to supply guidance control signals to the vehicle brake system through the control assembly 44 thereof. Also associated with the ground approach apparatus, is the radar guiding system 100 issuing signals to the aircraft receiver 102 operative to guide the aircraft through the vehicle servos 104. Finally, the speed of the vehicle is controlled by a vehicle speed control system 106 receiving signals from the Doppler radio equipment and transmitting signals to the vehicle brake system and the vehicle propelling rockets. In this manner, the speed of the vehicle may be retarded and the rocket motors progressively cutout.

From the foregoing description, the operation and utility of the system and apparatus of the present invention will be apparent. It will therefore be appreciated, that a practical mobile landing system has been devised which does not involve any dimensionally extensive mobile landing platform but rather is operative to clamp the aircraft to the mobile landing vehicle provided with suitable facilities for enabling the aircraft to be brought into close proximity to the vehicle and at substantially the same speed. The vehicle frame is therefore covered with shock absorbing material which shock absorbing material may also coat the aircraft clamping structure so as to avoid damage to the aircraft. It will also be appreciated, that other facilities may be provided on the vehicle in connection with landing operations such as heating devices for use during cold weather. In addition, the vehicle is provided with a sighting guide so as to enable the aircraft pilot to exercise fine control as the aircraft is positioned relative to the vehicle. Only when the aircraft is properly positioned with respect to the vehicle, will the nose sensing device 38 be rendered operative to energize the clamping arms so as to secure the aircraft to the vehicle. Thereafter, the vehicle speed controlling and guidance facilities may be operative to bring the aircraft in.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An emergency landing device for aircraft or the like comprising ground traction vehicle means adapted to support a craft capable of being propelled above the ground, vehicle propelling means mounted on the vehicle means for propulsion thereof at a speed in excess of the approaching speed of said craft, control means operatively connected to said propelled means for reducing the speed of the vehicle means to receive an approaching craft thereon with relative movement approaching zero, and means responsive to reception of said craft on the vehicle means as said relative movement approaches zero for clamping the craft to the vehicle means, said propelling means comprising a plurality of reaction engines mounted rearwardly of said vehicle means, said vehicle means comprising shock absorbing frame means, dirigible wheel means operatively mounted on the frame means for ground support thereof and sighting guide means mounted forwardly of the frame means, said control means comprising ignition means operatively connected to said reaction engines for starting thereof to accelerate the vehicle means to said speed in excess of the approaching craft, power operated brake means operatively connected to said dirigible wheel means for vehicle guidance and retardation, and remote controlled means operatively connected to the ignition means and the power operated brake means for respective control thereof in accordance with the relative positions and speeds of the vehicle means and the approaching craft to decelerate the vehicle means to the speed of the approaching craft prior to clamping thereof on the vehicle means, said means for clamping the craft to the vehicle means comprising, craft engaging means mounted on the vehicle means for movement between a retracted condition and a craft clamping condition, power operated means rendered operative to impart movement to the craft engaging means, and craft sensing means mounted on the vehicle means adjacent said sighting guide means to render said power operated means operative when yieldably displaced by the approaching craft in proper position on the vehicle means.

2. The combination of claim 1 wherein said craft engaging means comprises airfoil clamping means adjustably mounted on the vehicle means for movement in planes parallel to vehicle movement and fuselage clamping means mounted on the vehicle means rearwardly of the airfoil clamping means for movement in a plane perpendicular to vehicle movement.

3. An emergency landing device for aircraft or the like comprising ground traction vehicle means adapted to support a craft capable of being propelled above the ground, vehicle propelling means mounted on the vehicle means for propulsion thereof at a speed in excess of the approaching speed of said craft, control means operatively connected to said propelling means for reducing the speed of the vehicle means to receive an approaching craft thereon with relative movement approaching zero, and means responsive to reception of said craft on the vehicle means as said relative movement approaches zero for clamping the craft to the vehicle means, said means for clamping the craft to the vehicle means comprising, craft engaging means mounted on the vehicle means for movement between a retracted condition and a craft clamping condition, power operated means rendered operative to impart movement to the craft engaging means, and craft sensing means mounted on the vehicle means adjacent a forward end thereof to render said power operated means operative when yieldably displaced by the approaching craft in proper position on the vehicle means.

4. The combination of claim 3 wherein said craft engaging means comprises airfoil clamping means adjustably mounted on the vehicle means for movement in planes parallel to vehicle movement and fuselage clamping means mounted on the vehicle means rearwardly of the airfoil clamping means for movement in a plane perpendicular to vehicle movement.

References Cited by the Examiner

UNITED STATES PATENTS

| 2,246,716 | 6/41 | Bottrill | 244—110 |
| 2,604,279 | 7/52 | Gerin | 244—63 |
| 2,783,005 | 2/57 | Kane | 244—63 |
| 2,923,504 | 2/60 | Ortega | 244—114 |
| 3,003,717 | 10/61 | Booker | 244—2 |
| 3,128,066 | 4/64 | Bailey | 244—114 |

FOREIGN PATENTS

| 592,717 | 2/60 | Canada. |

FERGUS S. MIDDLETON, *Primary Examiner.*

ANDREW H. FARRELL, MILTON BUCHLER,
*Examiners.*